United States Patent [19]

Doman

[11] 4,353,681

[45] Oct. 12, 1982

[54] WIND TURBINE WITH YAW TRIMMING

[75] Inventor: Glidden S. Doman, Granby, Conn.

[73] Assignee: United Technologies Corporation, Hartford, Conn.

[21] Appl. No.: 151,016

[22] Filed: May 19, 1980

[51] Int. Cl.³ .............................................. F03D 7/04
[52] U.S. Cl. ...................................... 416/11; 416/131
[58] Field of Search ..................................... 416/9–11, 416/131

[56] References Cited

U.S. PATENT DOCUMENTS

| 1,491,997 | 4/1924 | Messick | 416/131 |
| 1,786,057 | 12/1930 | Fales | 416/19 |
| 2,371,160 | 3/1945 | Everts | 416/19 |
| 2,484,291 | 10/1949 | Hays | 416/132 B |
| 4,088,420 | 5/1978 | Jacobs et al. | 416/9 |
| 4,201,514 | 5/1980 | Hüetter | 416/11 |
| 4,298,313 | 11/1981 | Hohenemser | 416/11 X |

FOREIGN PATENT DOCUMENTS

| 809179 | 7/1951 | Fed. Rep. of Germany | 416/10 |
| 896930 | 11/1953 | Fed. Rep. of Germany | 416/10 |
| 2739297 | 3/1978 | Fed. Rep. of Germany | 416/131 |
| 2715584 | 10/1978 | Fed. Rep. of Germany | 416/9 |
| 410278 | 4/1945 | Italy | 416/10 |
| 437964 | 7/1948 | Italy | 416/10 |

Primary Examiner—Everette A. Powell, Jr.
Attorney, Agent, or Firm—John Swiatocha

[57] ABSTRACT

Yaw trimming in large wind turbines is achieved by laterally offsetting the turbine yaw axis from the axis of rotation of the hub.

10 Claims, 10 Drawing Figures

WIND TURBINE WITH YAW TRIMMING

DESCRIPTION

1. Technical Field

This invention relates to wind turbines and more particularly to wind turbines designed for optimum performance when maintained in a particular orientation relative to wind direction.

2. Background Art

Wind turbines or windmills of the type having a hub or rotor with a plurality of airfoil blades mounted thereon and adapted to rotate about a horizontal axis, generally operate at peak efficiency when the rotor and blades are oriented into the wind or within a degree or two of that direction. To allow the hub to position itself into the wind, the hub and a shaft connecting the hub to the turbine load are generally pivotable about a vertical yaw axis. Heretofore, as far as is known, the yaw axes of such prior art wind turbines have been disposed generally in coplanar (intersecting) relation with the axis of rotation of the shaft.

Both active and passive means have been employed to trim the turbine in yaw for maintaining a desired orientation of the wind turbine with the wind. The active means generally employ a wind direction sensor which, through a suitable control system, activate means to power the hub in yaw to effect a disposition of the hub into the wind and means to maintain such disposition for as long as the wind direction remains constant. The passive apparatus generally rely on a "weather vane" effect wherein side loading of the hub and collateral structure by the wind maintains the alignment of the turbine with the wind. While the active means may effectively position and hold the turbine into the wind, such means generally involve complex apparatus and therefore, tend to lower the economic efficiency of the turbine, thus raising the cost of the power provided by the turbine.

The passive or weather vane mechanism of trimming the turbine in yaw has proven to be relatively effective when applied to wind turbines having relatively short and stiff blades. However, in modern, large wind turbines, having blades of 125 feet or more in length, to achieve a minimization of weight, the blades are sometimes of a hollow, composite construction of substantial inherent elasticity. Such wind turbine blades if rigidly mounted to the hub and exposed to vertical wind velocity gradients and gravitational forces during normal operation, tend to cyclically bend or "flap", militating against maintenance of the orientation of the turbine into the wind. If, for purposes of accommodating the vertical wind velocity gradients, the blades are pivotally mounted on the hub in pivotal relation to a "teeter" axis transverse to the axis of rotation of the hub and shaft, rotation of the blades so mounted eliminates such elastic flapping but nevertheless results in a horizontal precession of the hub and blades about the teeter axis. Such precession is the result of the combined rotation and teetering of the blades under the influence of vertical wind velocity gradients and gravity and causes the turbine to angularly displace itself from the proper orientation with respect to the wind by pivotal movement about the yaw axis.

DISCLOSURE OF THE INVENTION

Accordingly, it is an object of the present invention to provide a wind turbine with improved means for trimming the turbine in yaw for setting and maintaining the orientation of the turbine directly into the wind.

It is another object of the present invention to provide such a wind turbine wherein the trimming means are passive in nature.

It is another object of the present invention to provide such a wind turbine wherein the trimming means are economical, making no substantial contribution to the cost of the turbine or the energy produced thereby.

In accordance with the present invention, a wind turbine is provided with a passive means for trimming the turbine in yaw thereby setting and maintaining the orientation of the wind turbine generally into the wind despite blade flapping and/or teetering about the hub teeter axis. Such a yaw trimming means is provided by an offset disposition of the yaw axis from the axis of rotation of the hub. The amount of offset will be determined by the average wind velocity for the locality in which the turbine is to operate, the magnitude of the average vertical wind velocity gradient, and the geometry of the turbine itself. Due to the aforementioned flapping or teetering of the blades, this thrust vector is angularly offset or cocked from the hub axis of rotation. Laterally offsetting the yaw axis from the axis of rotation to a position colinear with the cocked thrust vector prevents the thrust vector from establishing a moment or couple imbalance of the turbine about the yaw axis and trims the turbine in yaw to an angular orientation or heading substantially into the wind for optimal efficiency of operation. The yaw axis may be further offset to compensate for yaw imbalance due to the application of blade bending moments to the turbine nacelle as well as compensating for the hereinabove noted thrust vector offset.

The foregoing, and other features and advantages of the present invention, will become more apparent in the light of the following description and accompanying drawing.

BEST MODE FOR CARRYING OUT THE INVENTION

Figure 1:
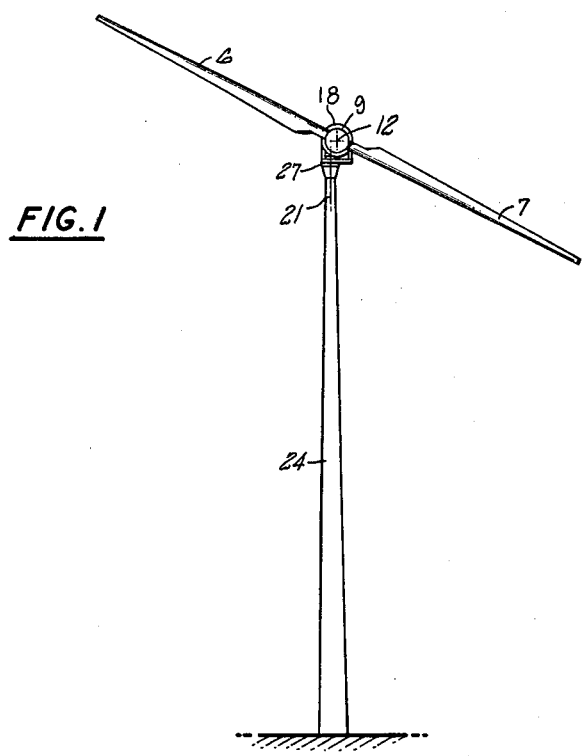
FIG. 1 is a front elevation view of the wind turbine of the present invention.
Figure 4:
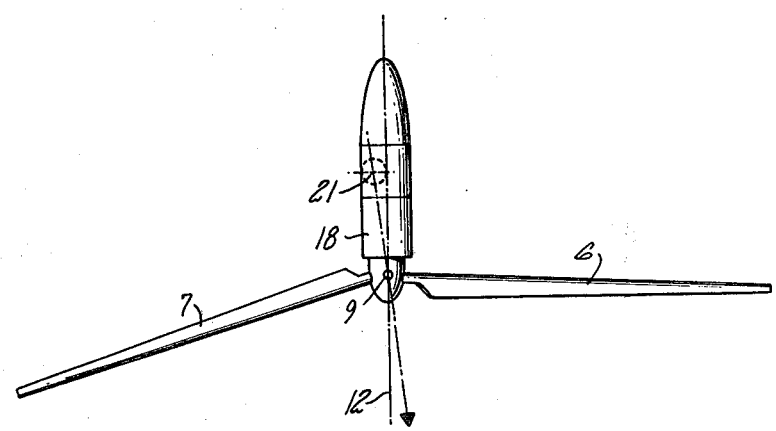
FIG. 4 is a top plan view of the wind turbine of the present invention illustrating the coincidence of the turbine yaw axis with the vector representation of the net wind thrust acting on the turbine blades.

Referring to FIGS. 1-4, the yaw stabilized wind turbine of the present invention comprises a pair of airfoil blades 6 and 7 mounted on a rotatable hub 9 and extending forwardly and radially outwardly from the hub. The hub is rotatable about an axis of rotation 12 and connected to the wind turbine load, i.e. an electrical generator or alternator (not shown) by main shaft 15 (FIG. 2), also rotatable about axis 12. The load and any gearing (not shown) required to step up the rotational speed of shaft 15 to the load are disposed in nacelle 18, in normal operation, the nacelle being disposed immediately upwind of the blades and hub. The nacelle and hub-blade assembly are pivotable as a weather vane, by the wind, about a yaw axis 21 which may coincide with tower or supporting structure 24, pivotably supporting the wind turbine thereof on yaw bearing 27. As best seen in FIGS. 1 and 4, yaw axis 21 is laterally offset from axis of shaft rotation 12 for purposes of stabilizing the wind turbine in yaw to maintain the heading of the turbine hub generally into the wind or within a degree or two thereof as described hereinafter.

Figure 6:
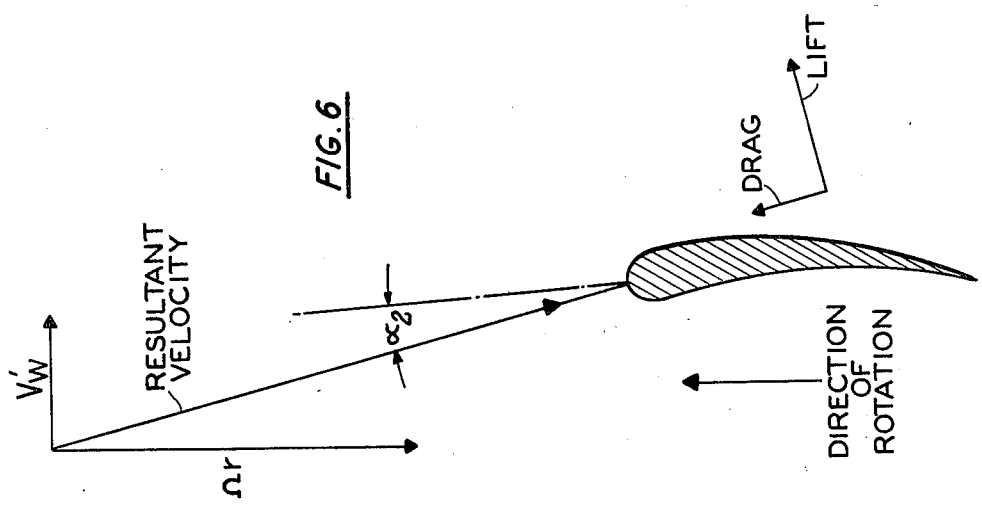
FIG. 6 is a sectional view of the lower blade illustrated in FIG. 3 and is taken along line 6—6 of FIG. 3 and illustrates the lift and drag forces acting on that blade.
Figure 5:
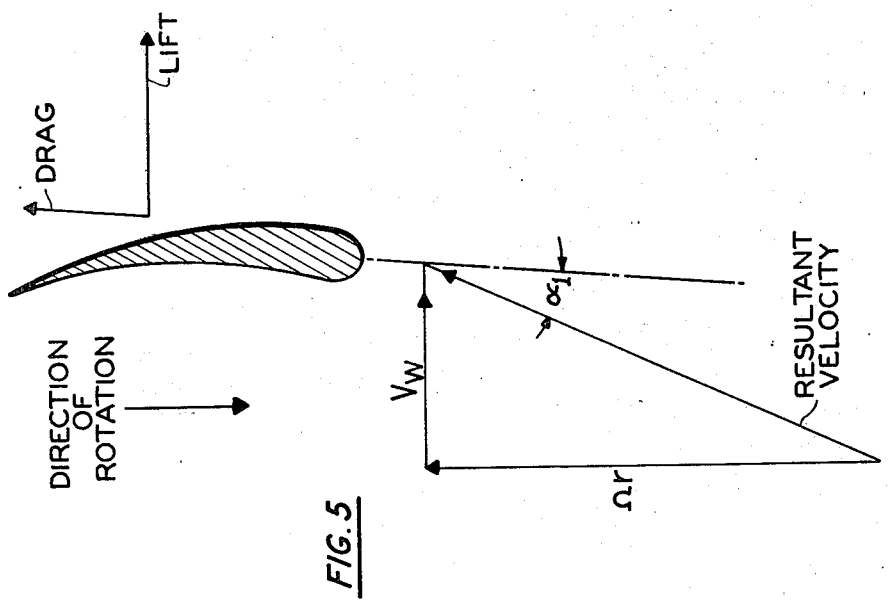
FIG. 5 is a sectional view of the upper blade illustrated in FIG. 3, this view being taken along line 5—5 of FIG. 3 and illustrating the lift and drag forces on that blade.

As is generally known, winds often exhibit vertical velocity gradients. That is, wind speed proximal the surface of the earth is typically significantly lower in magnitude than wind speed measured at points distal the earth's surface, i.e. two or three hundred feet therefrom. Accordingly, assuming the blades are of equal pitch, as the blades rotate, at any single point in time the uppermost blade is exposed to winds of higher velocity and angle of attack than is the lowermost blade. Referring to FIGS. 5 and 6, upper blade 6 at any axial location thereon defined by radius r measured from the hub axis of rotation, is acted upon by air of a resultant velocity comprising the vector sum of the velocity of the wind at radius r ($V_w$) and the wind velocity $\Omega r$ experienced by the blade due only to its own rotation. The resultant defines with the chord of blade 6, an angle of attack $\alpha_1$. Likewise, the resultant velocity of the wind acting on blade 7, the lowermost blade, is the vector sum of wind velocity $V_w'$ measured at radius r and the velocity $\Omega r$ experienced by blade 7 due to its own rotation. This resultant, due to the magnitude of $V_w'$ defines with the chord of blade 7, an angle of attack $\alpha_2$, substantially less than angle $\alpha_1$. Since the lift associated with each of the blade 6 and 7 is proportional to the angle of attack, the lift on the uppermost blade is, as illustrated, substantially greater than the lift on the lower blade. As the blades rotate, each blade periodically assumes upper and lower positions and therefore, where the blades are rigidly mounted to the rotor, the variation in lift acting on each blade as it periodically assumes upper and lower positions causes a periodic bending or "flapping" of the blade. Such flapping is not only potentially injurious to the blade, but causes the turbine to yaw off its proper heading due in part to yaw disturbing moments resulting directly from blade bending and in part to an angular shift in the vector resultant of thrust acting on the blades.

Figure 2:
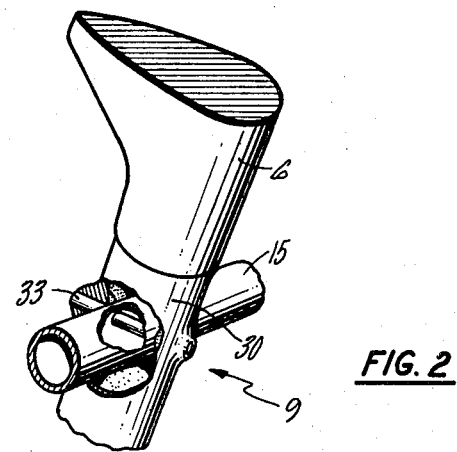
FIG. 2 is an enlarged isometric view of the interior of the turbine hub, portions of the hub being broken away to show details of construction.
Figure 3:
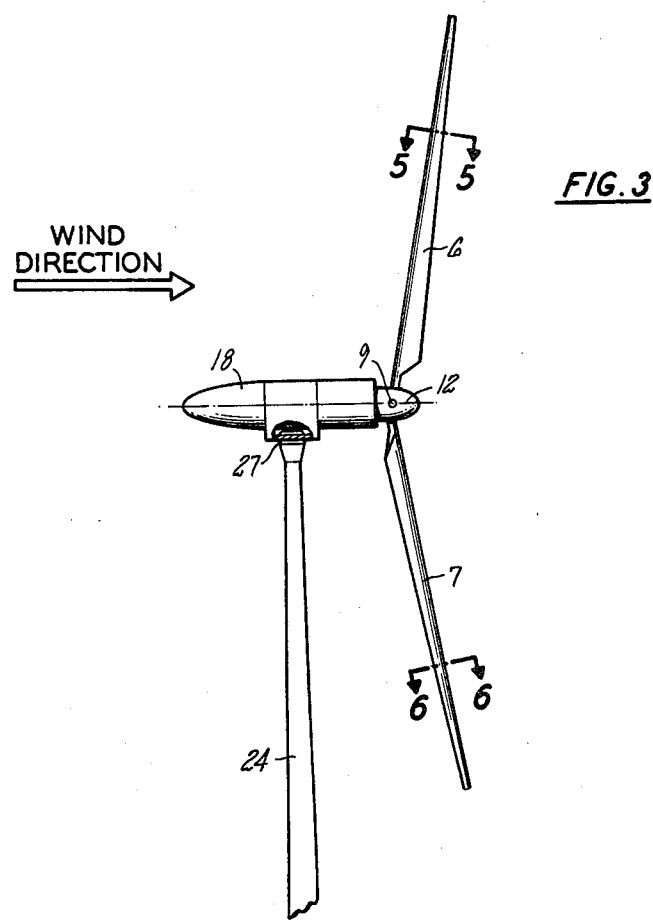
FIG. 3 is a side elevation view of the wind turbine of the present invention.

The periodic bending or flapping may be eliminated by a pivotable connection between the blades and hub as illustrated in FIG. 2. As shown, the blades are mounted on a hollow stub shaft 30 which receives the main shaft 15 therethrough. The main and stub shafts are provided with aligned apertures which receive a hinge pin 33 therethrough, the hinge pin being generally transverse both to the axis of rotation 12 and longitudinal axes of the blades. With this "hinged" or "teetered" construction, the hereinabove noted periodic blade flapping is replaced by a cyclic pivoting of the blades on the hub about the longitudinal axis of the hinge pin (teeter axis). Accordingly, as the blades rotate under the influence of the prevailing wind, they will cyclically move into against and away from with the wind by cyclic teetering on hinge pin 33.

Figure 7:
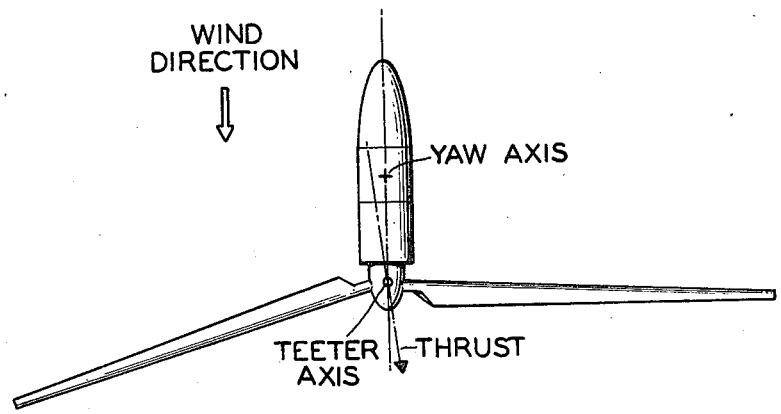
FIG. 7 is a top plan view of a prior art wind turbine construction wherein the yaw axis and hub axis of rotation intersect. This drawing illustrates the cocking of the net rotor thrust vector from the axis of rotation of the hub in response to flapping or teetering of the blades.
Figure 8:
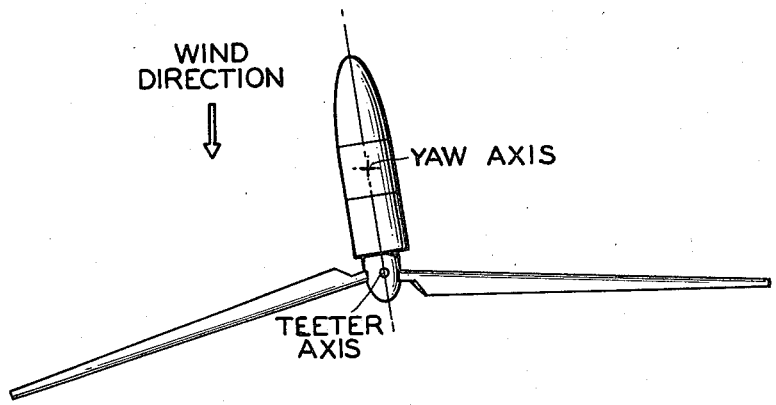
FIG. 8 is a view similar to FIG. 7, but illustrating the yaw misalignment of the prior art wind turbine with the wind direction due to the angular offset or cocking of the thrust vector with respect to the yaw axis.

This teetering about the hinge pin as the blades rotate, causes by precession, a pivoting of the hub and blades about the teeter axis that is of greatest magnitude when the hinge pin is oriented vertically. While the magnitude of this precessional teetering will depend upon the wind speed, wind gradient, blade configuration and other aspects of turbine design and operating conditions, such precessional teetering angularly displaces the hub and blades a degree or two from the wind direction. Referring to FIG. 7, the angular displacement of the hub and blades out of alignment with the wind affects a similar cocking or angular displacement of the vector resultant of the net thrust acting on the blades, this thrust vector being defined as extending normal to a line inntersecting the blade tips. The cocking of the thrust vector angularly displaces the vector from the colinear orientation with the yaw axis. Therefore, the offset thrust vector applies a yaw moment to the turbine resulting in an exaggerated yaw displacement from the desired wind direction as shown in FIG. 8.

Figure 9:
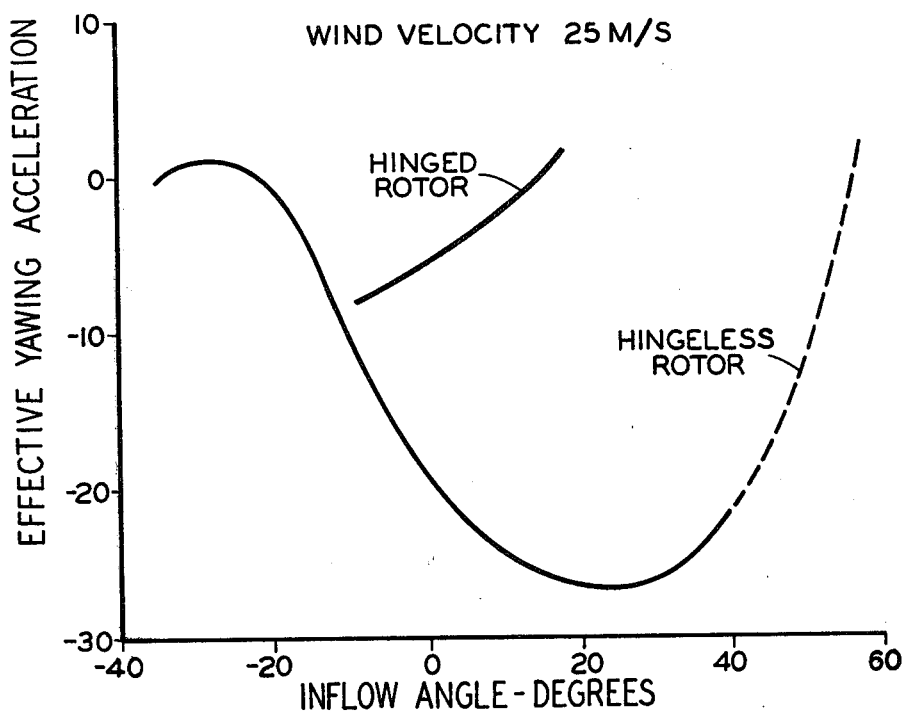
FIG. 9 is a graphical representation of the relationship between yaw acceleration and yaw angle for a pair of typical arge wind turbines constructed in accordance with the prior art as shown in FIGS. 7 and 8, one of the turbines being provided with a teetered connected between the blades and hub and the other provided with a rigid connection.

Referring to FIG. 9, the effects of the offset of the thrust vector coupled with the resulting hub yaw displacement are shown for typical, prior art hinged (teetered blade connection) and hingeless (rigid blade connection) large wind turbine rotors at a wind speed of 25 meters per second. As shown in these curves, both hinged and hingeless wind turbine rotors allowed to freely pivot about a yaw axis will displace themselves in yaw significantly from the desired 0° heading (in-flow angle). Thus, the hinged rotor if started at 0° in-flow angle will yaw off heading approximately 15° while the hingeless rotor if set at 0° could yaw -33, -22, or approximately 55° off the desired heading before reaching equilibrium headings (zero yawing acceleration). Both turbines are stabilized in yaw at least offset yaw headings due to a balancing of the thrust moment by aerodynamic forces on the blades.

Figure 10:
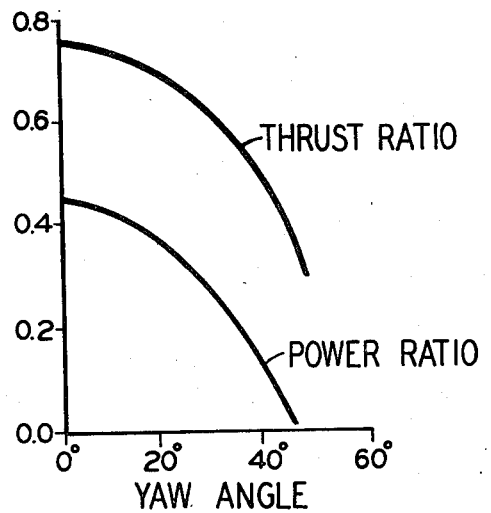
FIG. 10 is a graphical representation of the relationships between power ratio and yaw angle and between thrust ratio and yaw angle for a typical large wind turbine.

As illustrated in FIG. 10, both thrust and power ratios are optimized by maintaining the heading of the turbine substantially directly into the wind. The power ratio is a measure of the output power of the turbine divided by the available power of the wind stream intercepted by the turbine and the thrust ratio is a measure of the thrust on the turbine blades divided by the net available thrust from the column of wind intercepted by the turbine blades. Accordingly, as shown in FIG. 10, any substantial displacement from the desired 0° yaw angle heading will severely detract from the power generating capabilities of the turbine.

To overcome the deficiencies in yaw stabilization associated with prior art wind turbines wherein the axis of rotation of the hub and the yaw axis intersect, in the wind turbine of the present invention, the yaw axis is laterally offset from the axis of rotation of the hub by an amount which positions the yaw axis in line with the angularly displaced thrust vector resulting from any precession of the hub and blades about the teeter axis due to blade bending or teetering. Thus, as shown in FIG. 4, the net offset thrust on the blades is represented by a thrust vector acting through the yaw axis. Thus, the cocked thrust vector does not result in an unbalanced moment applied to the turbine, but rather acts through this axis and thereby cannot cause further yawing of the turbine away from the desired heading. Accordingly, the turbine will remain operational at the slightly offset heading due to the precession the magnitude of such off-set a degree or two, detracting only minimally from the power generating capabilities of the turbine.

Therefore, not only does the wind turbine of the present invention remain essentially stable in yaw, but does so in an entirely passive way without requiring complicated and costly wind sensors and means for positioning the turbine in yaw and maintaining a desired yaw position. The amount of offset between the yaw axis and the axis of rotation of the hub will, of course, depend upon the design geometry of the turbine and the prevailing wind conditions under which the turbine is required to operate. With such parameters, the yaw imbalance due to blade flapping or teetering may be calculated and the yaw axis offset sufficiently to compensate for such imbalance.

While the wind turbine of the present invention has been described in connection with turbines having two teetered blades, it will be appreciated that this invention may be employed with turbines having any number of hinged or hingeless blades. When the invention is applied to hingeless turbines, the yaw axis will be offset to compensate not only for the offset thrust vector but for the yaw imbalancing blade bending moments noted hereinabove. Where greater than two blades are employed in a wind turbine having teetered blades, the blades will be connected to the hub by an arrangement of gimballed bearings rather than a single hinge. Furthermore, the arangement of the present invention may be employed with turbines having either variable or fixed pitch blades. Accordingly, it will be appreciated that although the invention has been shown and described with respect to exemplary embodiments thereof, various changes and omissions in form and detail may be made therein without departing from the spirit and the scope of the invention.

I claim:

1. A horizontal axis, free yaw wind turbine comprising a plurality of airfoil blades mounted on a hub rotatable about an axis of rotation, said hub being pivotable about a yaw axis, said wind turbine being characterized by said yaw axis being laterally offset from the axis of rotation of said hub and the vector resultant of thrust on said blades acting through said yaw axis for stabilizing said hub in yaw against the influence of vertical wind velocity gradients acting on said blades.

2. A wind turbine according to claim 1 wherein said blades are pivotally mounted to said hub, about an axis generally perpendicular to both the axis of rotation of said hub and the longitudinal axes of said blades.

3. A wind turbine according to claim 1 wherein said hub axis of rotation and a line interconnecting said yaw axis with said axis of rotation at said hub, intersect at an angle substantially equal to that by which a vector resultant of the thrust on said airfoil blades deviates from the axis of rotation of said hub due to said wind velocity gradient.

4. A wind turbine according to claim 1 wherein said wind turbine is adapted to operate with said hub downwind of said yaw axis.

5. A wind turbine according to claim 3 wherein said angle equals approximately 1°.

6. A horizontal axis, free yaw wind turbine comprising:
a hub rotatable about an axis of rotation,
a plurality of airfoil blades mounted on said hub, said blades being responsive to vertical wind velocity gradients acting thereon by periodic movement with and against the wind,
said periodic movement causing a precessional response of said blades thereby effecting an angular deviation in the vector resultant of wind thrust acting on said blades from the hub axis of rotation,
said wind turbine characterized by a lateral offset of said yaw axis from the axis of rotation of said hub sufficient to cause the vector resultant of thrust on said blades to act through said yaw axis to minimize yaw imbalance due to an otherwise unbalanced moment from the offset of said thrust resultant from said yaw axis.

7. A wind turbine according to claim 6 wherein a axis is generally colinear with said thrust vector resultant.

8. A wind turbine according to claim 6 wherein said axis of rotation of said hub and a line connecting said yaw axis with said axis of rotation at said hub are angularly offset an amount generally equal to the angular deviation from said wind direction of said net wind thrust acting on said blades.

9. A wind turbine according to claim 6 wherein said periodic airfoil blade movement into and out of said wind comprises a cyclic bending of said blades due to an inherent elasticity thereof.

10. A wind turbine according to claim 8 wherein said angular offset is approximately equal to 1°.

* * * * *